United States Patent
Feng et al.

(10) Patent No.: US 9,787,437 B2
(45) Date of Patent: Oct. 10, 2017

(54) UPLINK ACK/NACK BUNDLING ENHANCEMENT FOR LTE TDD ENHANCED INTERFERENCE MANAGEMENT AND TRAFFIC ADAPTATION

(71) Applicant: QUALCOMM Incorporated, San Diego, CA (US)

(72) Inventors: Minghai Feng, Beijing (CN); Jiming Guo, Beijing (CN); Neng Wang, Beijing (CN); Jilei Hou, Beijing (CN); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/421,130

(22) PCT Filed: Sep. 12, 2013

(86) PCT No.: PCT/CN2013/083390
§ 371 (c)(1),
(2) Date: Feb. 11, 2015

(87) PCT Pub. No.: WO2014/040546
PCT Pub. Date: Mar. 20, 2014

(65) Prior Publication Data
US 2015/0229446 A1 Aug. 13, 2015

(30) Foreign Application Priority Data

Sep. 14, 2012 (WO) ................ PCT/CN2012/081410

(51) Int. Cl.
H04L 1/16 (2006.01)
H04L 5/14 (2006.01)
(Continued)

(52) U.S. Cl.
CPC .......... *H04L 1/1621* (2013.01); *H04L 1/1607* (2013.01); *H04L 5/1415* (2013.01); *H04W 72/0446* (2013.01); *H04L 1/06* (2013.01); *H04L 1/1861* (2013.01)

(58) Field of Classification Search
CPC ....... H04L 1/16; H04L 1/1621; H04L 1/1607; H04W 72/04; H04W 72/0446
See application file for complete search history.

(56) References Cited

U.S. PATENT DOCUMENTS

2010/0322158 A1* 12/2010 Lee ..................... H04L 5/001
370/329
2012/0099491 A1 4/2012 Lee et al.
(Continued)

FOREIGN PATENT DOCUMENTS

CN 102461301 A 5/2012
CN 102468942 A 5/2012
(Continued)

OTHER PUBLICATIONS

International Search Report and Written Opinion—PCT/CN2013/083390—ISA/EPO—Dec. 19, 2013.
(Continued)

*Primary Examiner* — Feben M Haile
(74) *Attorney, Agent, or Firm* — Arent Fox, LLP

(57) ABSTRACT

A method, an apparatus, and a computer program product for wireless communication are provided. The apparatus groups subframes of a time division duplex (TDD) configuration of a serving cell into a set of anchor subframes and a set of non-anchor subframes. The apparatus also separately bundles positive acknowledgements (ACKs) and/or negative acknowledgements (NACKs) of the anchor subframes, and ACKs and/or NACKs of the non-anchor subframes.

35 Claims, 12 Drawing Sheets

(51) Int. Cl.
*H04W 72/04* (2009.01)
*H04L 1/18* (2006.01)
*H04L 1/06* (2006.01)

(56) References Cited

U.S. PATENT DOCUMENTS

| | | | | |
|---|---|---|---|---|
| 2013/0223296 A1* | 8/2013 | Zeng | ................. | H04L 5/0007 370/280 |
| 2013/0301433 A1* | 11/2013 | Yin | ................. | H04W 16/02 370/252 |
| 2014/0029490 A1* | 1/2014 | Kim | ................. | H04W 72/1289 370/280 |
| 2016/0204906 A1* | 7/2016 | Cheng | ................. | H04L 1/0077 370/280 |

FOREIGN PATENT DOCUMENTS

| | | |
|---|---|---|
| WO | 2012028025 A1 | 3/2012 |
| WO | 2012118356 A2 | 9/2012 |

OTHER PUBLICATIONS

International Search Report and Written Opinion—PCT/CN2012/081410—ISA/EPO—Jun. 13, 2013.
Response to Written Opinion—PCT/CN2013/083390—Jun. 20, 2014.
Chapter II Demand—PCT/CN2013/083390—Jun. 20, 2014.
CATT: "Enhancements on HARQ-ACK for Rel-11 Carrier Aggregation", 3GPP Draft; R1-122027, 3rd Generation Partnership Project (3GPP), Mobile Competence Centre; 650, Route Des Lucioles; F-06921 Sophia-Antipolis Cedex; France, vol. RAN WG1. No. Prague. Czech Republic; May 21, 2012-May 25, 2012, May 12, 2012 (May 12, 2012), XP050600318, pp. 4.
QUALCOMM Incorporated: "On Enhanced A/N Bundling for CA Operation", R1-123677, 3rd Generation Partnership Project (3GPP), Mobile Competence Centre; 650, Route Des Lucioles; F-06921 Sophia-Antipolis Cedex; France, vol. RAN WG1. No. Qingdao. China; Aug. 13, 2012-Aug. 17, 2012 Aug. 5, 2012 (Aug. 5, 2012), XP050661551, pp. 3.
Samsung: "TDD HARQ-ACK Bundling for PUCCH Format 3", R1-122214, 3rd Generation Partnership Project (3GPP), Mobile Competence Centre; 650, Route Des Lucioles; F-06921 Sophia-Antipolis Cedex; France, vol. RAN WG1. No. Prague. Czech Republic; May 12, 2012 (May 12, 2012), XP050600478, pp. 5.
Supplementary European Search Report—EP13837643—Search Authority—The Hague—Apr. 11, 2016.

\* cited by examiner cfg0 (D S U U U)
cfg1 (D S U U D)
cfg2 (D S U D D)
cfg3 (D S U U U D D D D D)
cfg4 (D S U U D D D D D D)
cfg5 (D S U D D D D D D D)
cfg6 (D S U U U D S U U D)

UPLINK ACK/NACK BUNDLING ENHANCEMENT FOR LTE TDD ENHANCED INTERFERENCE MANAGEMENT AND TRAFFIC ADAPTATION

CROSS-REFERENCE TO RELATED APPLICATION(S)

This application is a national phase of PCT Application Serial No. PCT/CN2013/083390, entitled "Uplink ACK/NACK Bundling Enhancement for LTE TDD Enhanced Interference Management and Traffic Adaptation" and filed on Sep. 12, 2013, which claims priority to PCT Application Serial No. PCT/CN2012/081410, entitled "Uplink ACK/NACK Bundling Enhancement for LTE TDD eIMTA" and filed on Sep. 14, 2012, both of which are expressly incorporated by reference herein in their entirety.

BACKGROUND

Field

The present disclosure relates generally to communication systems, and more particularly, to uplink acknowledgement (ACK or NACK) bundling enhancement for LTE time division duplex (TDD) enhanced interference management and traffic adaptation (eIMTA).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus groups subframes of a time division duplex (TDD) configuration of a serving cell into a set of anchor subframes and a set of non-anchor subframes. The apparatus also separately bundles positive acknowledgements (ACKs) and/or negative acknowledgements (NACKs) of the anchor subframes, and ACKs and/or NACKs of the non-anchor subframes.

BRIEF DESCRIPTION OF THE DRAWINGS

FIG. 7 is a diagram illustrating the various TDD configurations available in LTE.

DETAILED DESCRIPTION

Figure 1:
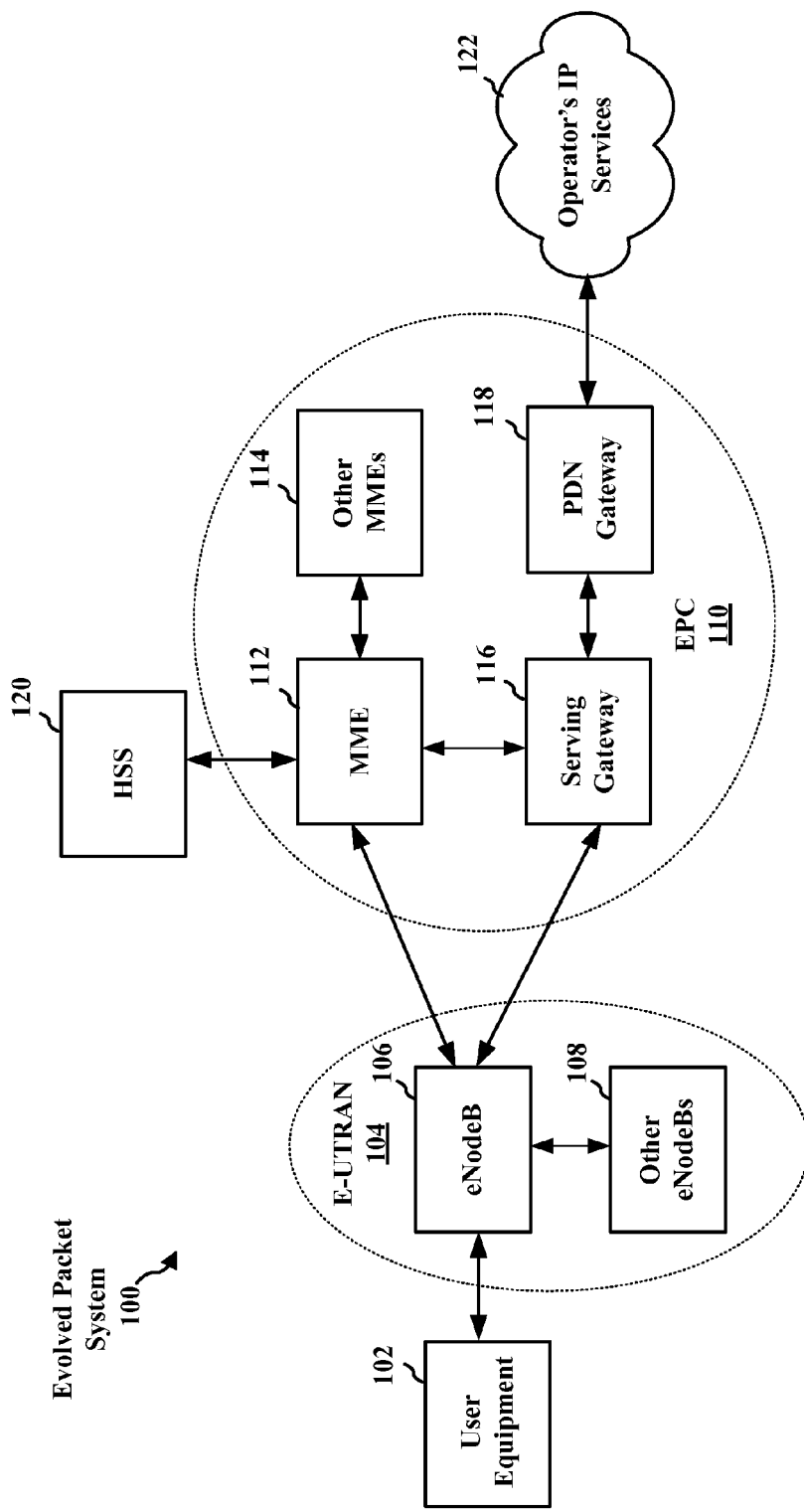
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
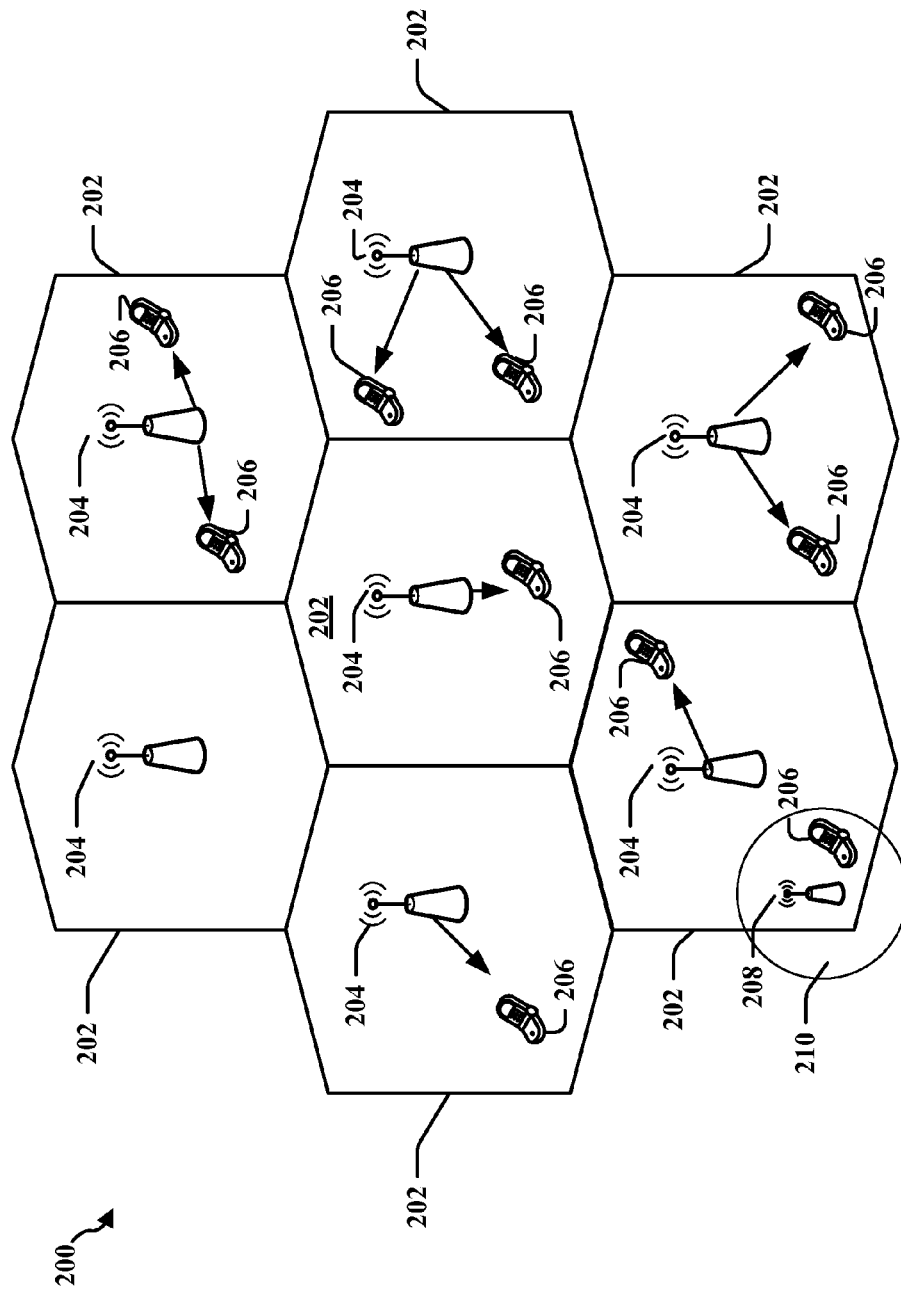
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
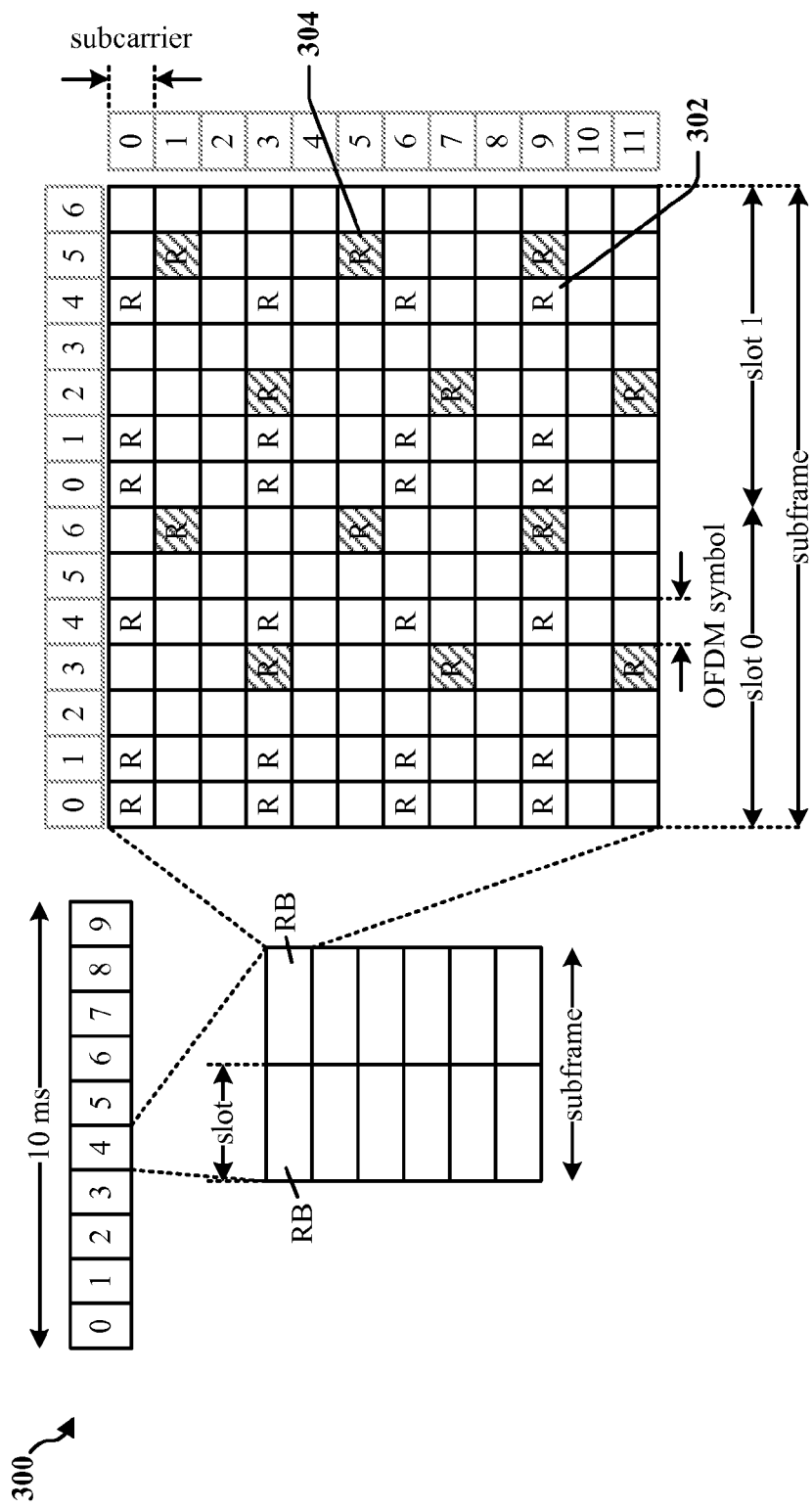
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
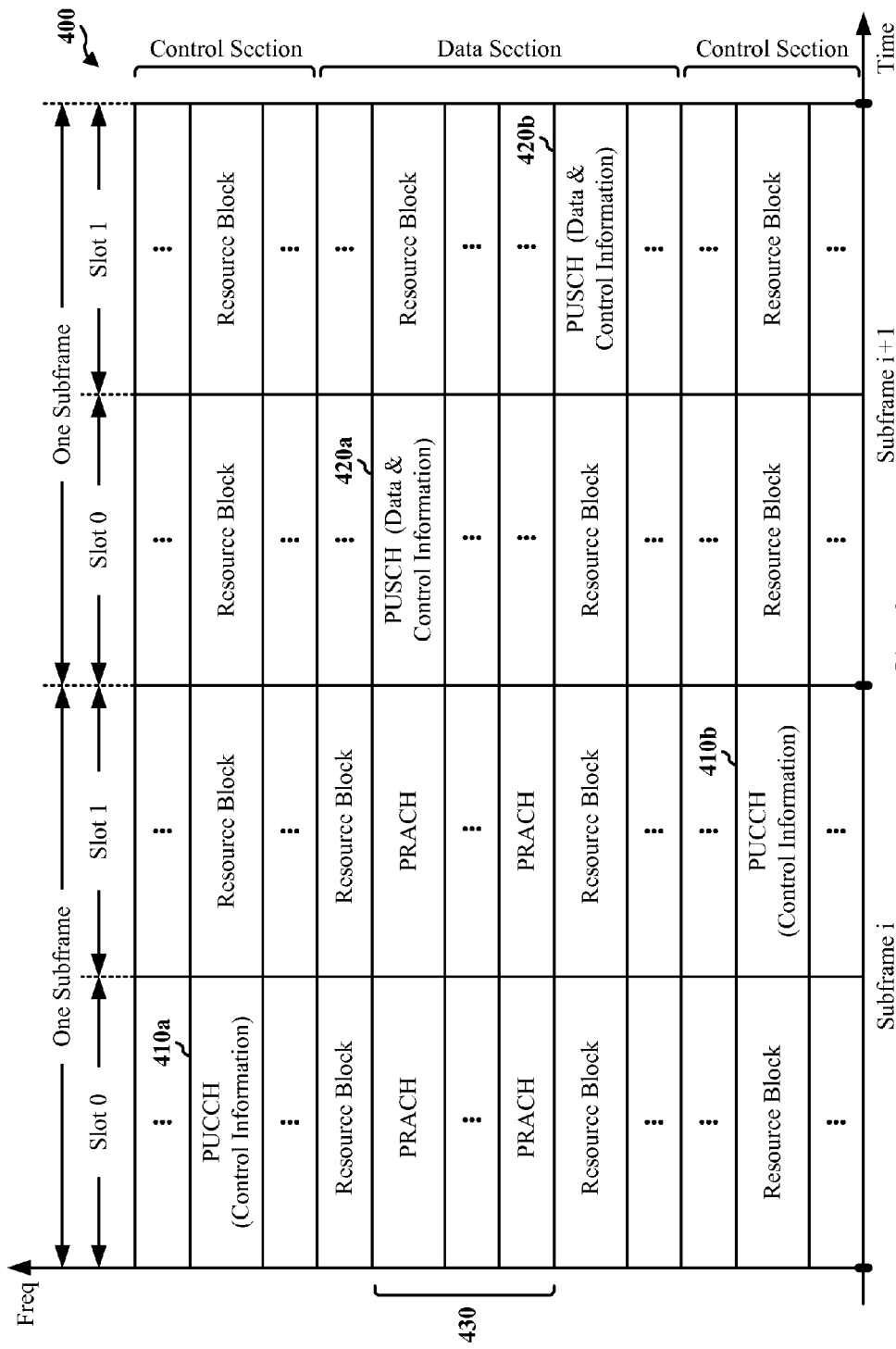
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
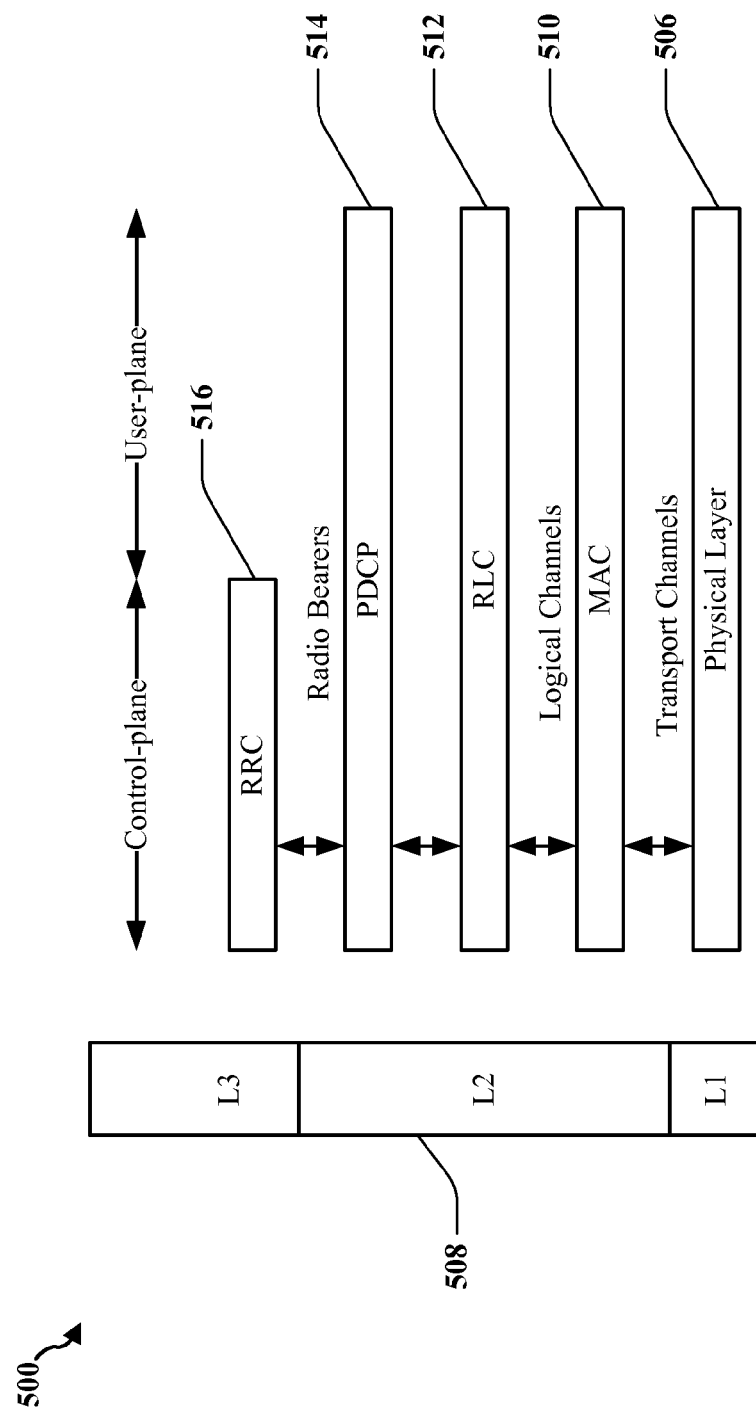
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
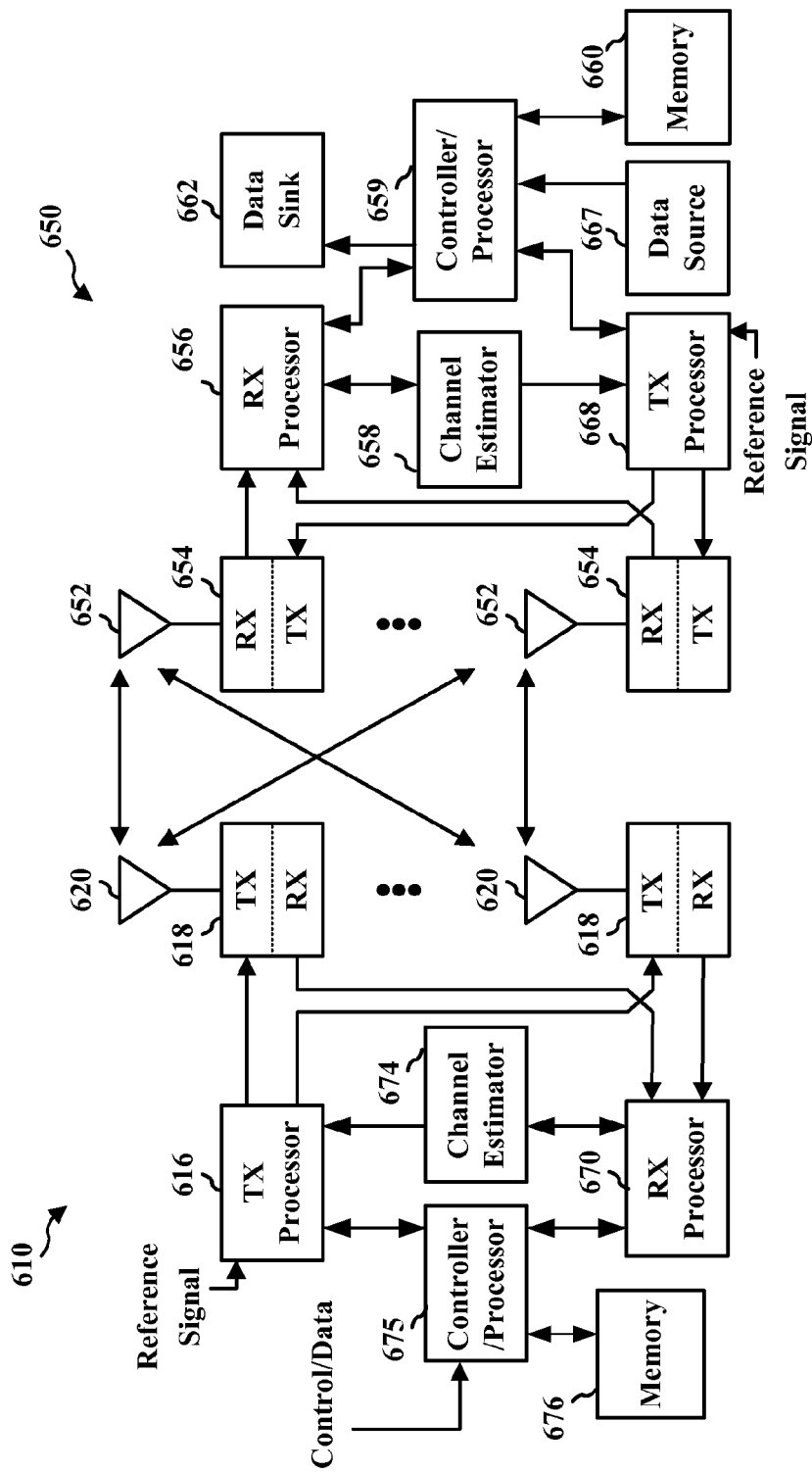
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7 illustrates the seven time division duplex (TDD) configurations for LTE, wherein "D" corresponds to a downlink subframe, "U" corresponds to an uplink subframe and "S" corresponds to a special subframe. Several of the TDD configurations are DL subframe heavy, including in particular configurations 2, 3, 4 and 5. For DL subframe heavy configurations, multiple ACK/NACK (A/N) for multiple DL subframes typically have to be transmitted in one UL subframe. In such cases, uplink A/N multiplexing and bundling is defined for TDD LTE. However, for some configurations, especially for TDD configuration 5

(DSUDDDDDDD), only A/N bundling is supported. A/N multiplexing is not supported.

With respect to TDD LTE eIMTA, adaptive or dynamic TDD configurations may be used to improve UL-DL traffic load balance. In this case, different DL subframes may be susceptible to different types of interference. On the UE side, in the case where corresponding subframes of a serving cell and a neighbor cell are both DL subframes, the UE will suffer normal DL to DL interference. In the case where corresponding subframes of a serving cell and a neighbor cell are DL and UL respectively, herein referred to at times as DL/UL coexisting subframes, the UE will suffer UL to DL (or UE to UE) interference. As a result, in different DL subframes there may be different types of interference that result in quite different DL block error result (BLER) performance. The A/N bundling rule is based on the assumption that a bundled DL subframe will experience similar channel fading and interference level, however if A/Ns of all of the DL subframes are bundled together, there is a high probability of unnecessary retransmission and degraded spectrum efficiency.

Figure 8:
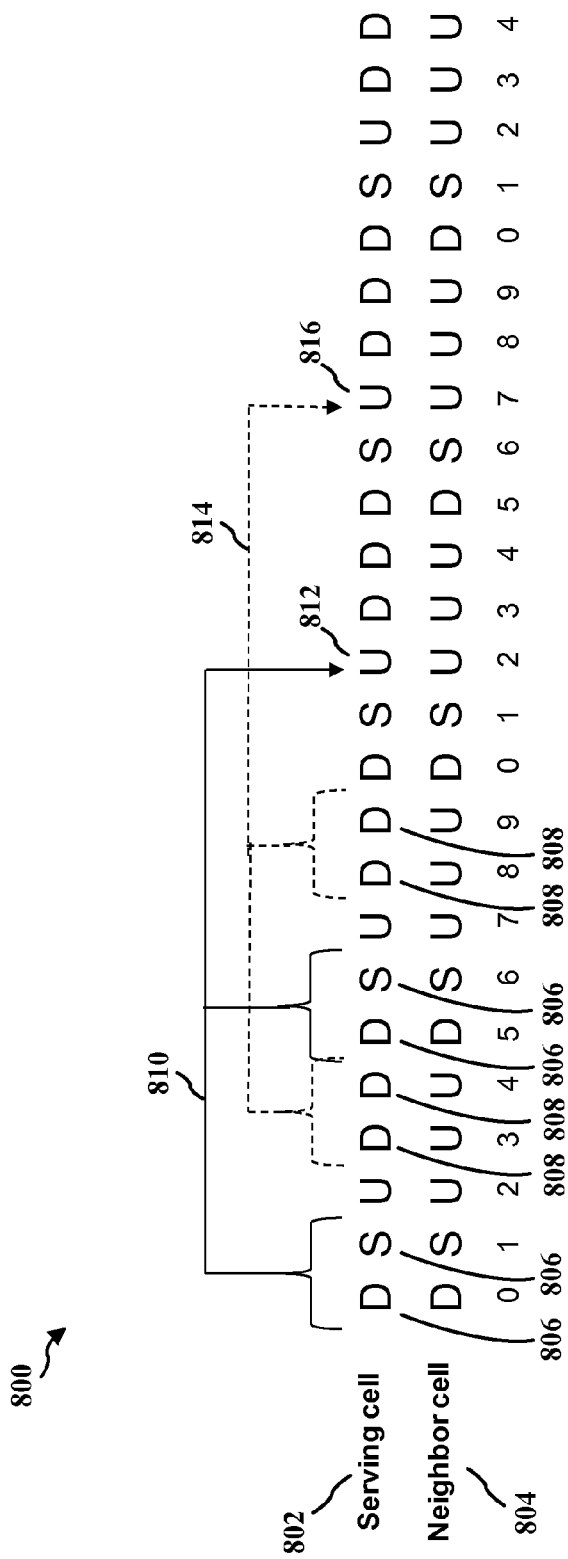
FIG. 8 is a diagram illustrating respective TDD configurations for a serving cell and a neighboring cell and a set of anchor subframes and non-anchor subframes.

FIG. 8 is a diagram illustrating a pair 800 of subframes, including the subframes of a TDD configuration for a serving cell 802 and the subframes of a TDD configuration for a neighboring cell 804. The subframes for the serving cell 802 correspond to a series of TDD configuration 2 (DSUDD) subframes, while the subframes for the neighbor cell 804 correspond to a series of TDD configuration 0 (DSUUU) subframes. The serving cell subframes 802 and neighboring cell subframes 804 are shown with respect to each other such that corresponding subframes are vertically aligned by subframe number.

To provide improved A/N uplink transmission by the UE, the subframes of the TDD configuration of the serving cell 802 are grouped into a set of anchor subframes 806 and a set of non-anchor subframes 808. In one arrangement, a downlink (D) subframe of the serving cell that is common with (or as illustrated in FIG. 8, vertically aligned with) a downlink subframe of the neighboring cell is designated as an anchor subframe 806. In other words, when corresponding numbered subframes of the serving cell and the neighboring cell are both downlink subframes, the serving cell subframe of that serving-cell/neighbor-cell pair is designated an anchor subframe 806. Likewise, a special (S) subframe of the serving cell that is common with a special subframe of the neighboring cell is designated as an anchor subframe 806. In other words, when corresponding numbered subframes of the serving cell and the neighboring cell are special subframes, the serving cell subframe of that serving-cell/neighbor-cell pair is designated an anchor subframe 806. A downlink subframe of the serving cell that coexists with an uplink (U) subframe of the neighboring cell is designated as a non-anchor subframe 808. In other words, when corresponding numbered subframes of the serving cell and the neighboring cell comprise a downlink subframe in the serving cell and an uplink subframe in the neighboring cell, the serving cell subframe of that serving-cell/neighbor-cell pair is designated a non-anchor subframe 808.

Once the subframes of the serving cell have been grouped into respective sets of anchor subframes 806 and non-anchor subframes 808, the A/Ns of the anchor subframes of the serving cell are bundled 810 to a first uplink subframe 812 of the serving cell for subsequent transmission. A/Ns may be bundled, for example, by a logical-AND operation, wherein the first uplink subframe 812 transmits an ACK when the acknowledgement of each of the anchor subframes 806 is an ACK. If the acknowledgement of any one of the anchor subframes 806 is a NACK, the first uplink subframe 812 transmits a NACK. Likewise, the A/Ns of the non-anchor subframes 808 are bundled 814 to a second uplink subframe 816 of the serving cell for subsequent transmission. The first UL subframe may be the first UL subframe of the next frame, while the second UL subframe may be the second UL subframe of the next frame. Alternatively, the bundled A/Ns of the anchor subframes may be multiplexed with the A/Ns of the non-anchor subframes and signaled together in one uplink subframe.

Figure 9:
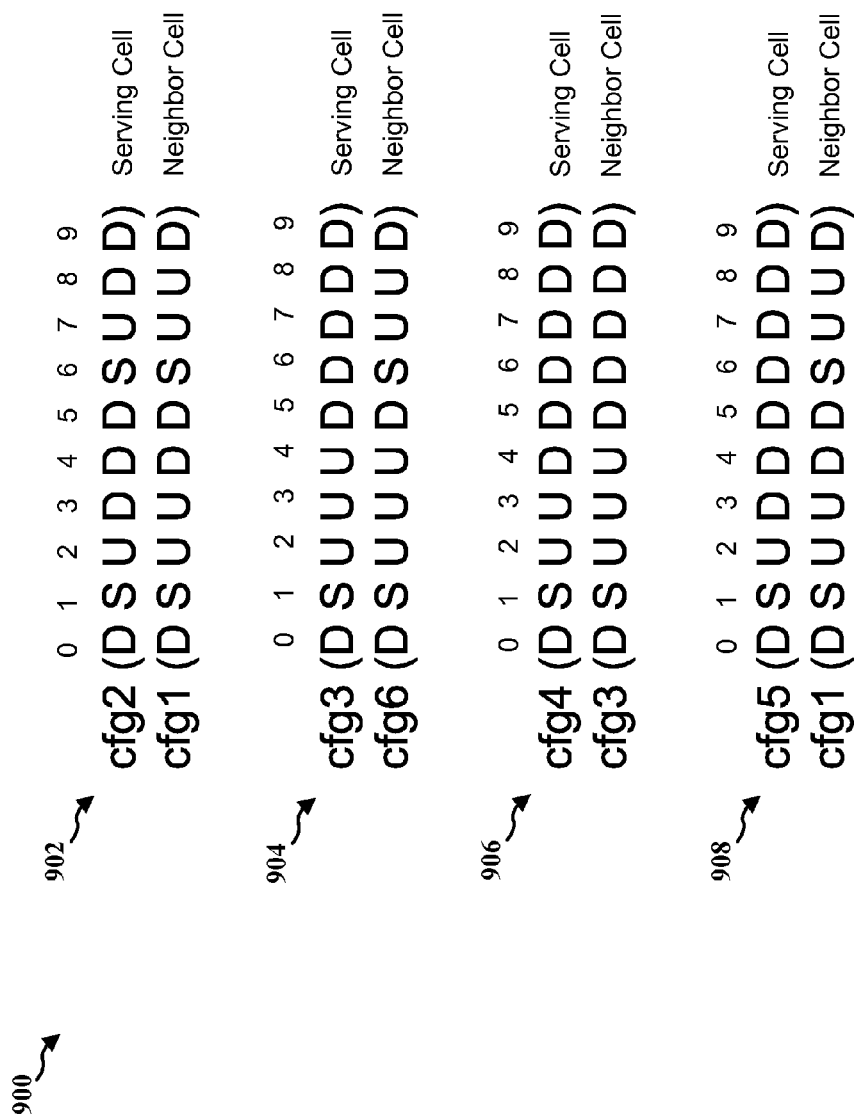
FIG. 9 is a diagram illustrating different examples of TDD configurations for a serving cell and a neighboring cell.

FIG. 9 illustrates several examples 900 of different coexisting serving cells and neighboring cells having respective TDD configurations, and the corresponding anchor subframe set and non-anchor subframe set to be used for A/N bundling. In the case 902 where a serving cell of TDD configuration 2 coexists with neighbor cell of TDD configuration 1, the A/Ns of the serving-cell subframes for anchor subframes 0/1/4/5/6/9 can be bundled as a first group, while the A/Ns of the serving-cell subframes for non-anchor subframes 3/8 can be bundled as a second group. In the case 904 where a serving cell of TDD configuration 3 coexists with neighbor cell of TDD configuration 6, the A/Ns of the serving-cell subframes for anchor subframes 0/1/5/6/9 can be bundled as a first group, while the A/Ns of the serving-cell subframes for non-anchor subframes 7/8 can be bundled as a second group.

In the case 906 where a serving cell of TDD configuration 4 coexists with a neighbor cell of TDD configuration 3, the A/Ns of the serving-cell subframes for anchor subframes 0/1/5/6/7/8/9 can be bundled as a first group, while the A/Ns of the serving-cell subframes for non-anchor subframe 4 can be bundled as a second group. In the case 908 where a serving cell of TDD configuration 5 coexists with a neighbor cell of TDD configuration 1, the A/Ns of the serving-cell subframes for anchor subframes 0/1/4/5/6/9 can be bundled as a first group, while the A/Ns of the serving-cell subframes for non-anchor subframes 3/7/8 can be bundled as a second group.

In another arrangement, a TDD configuration may have DL subframes that are fixed in the downlink direction and other subframes that are flexible or dynamic DL/UL subframes that are not fixed in the downlink direction. In this case, fixed DL subframes of the serving cell are designated as anchor subframes, while flexible DL/UL subframes of the serving cell are designated as non-anchor subframes.

Figure 10:
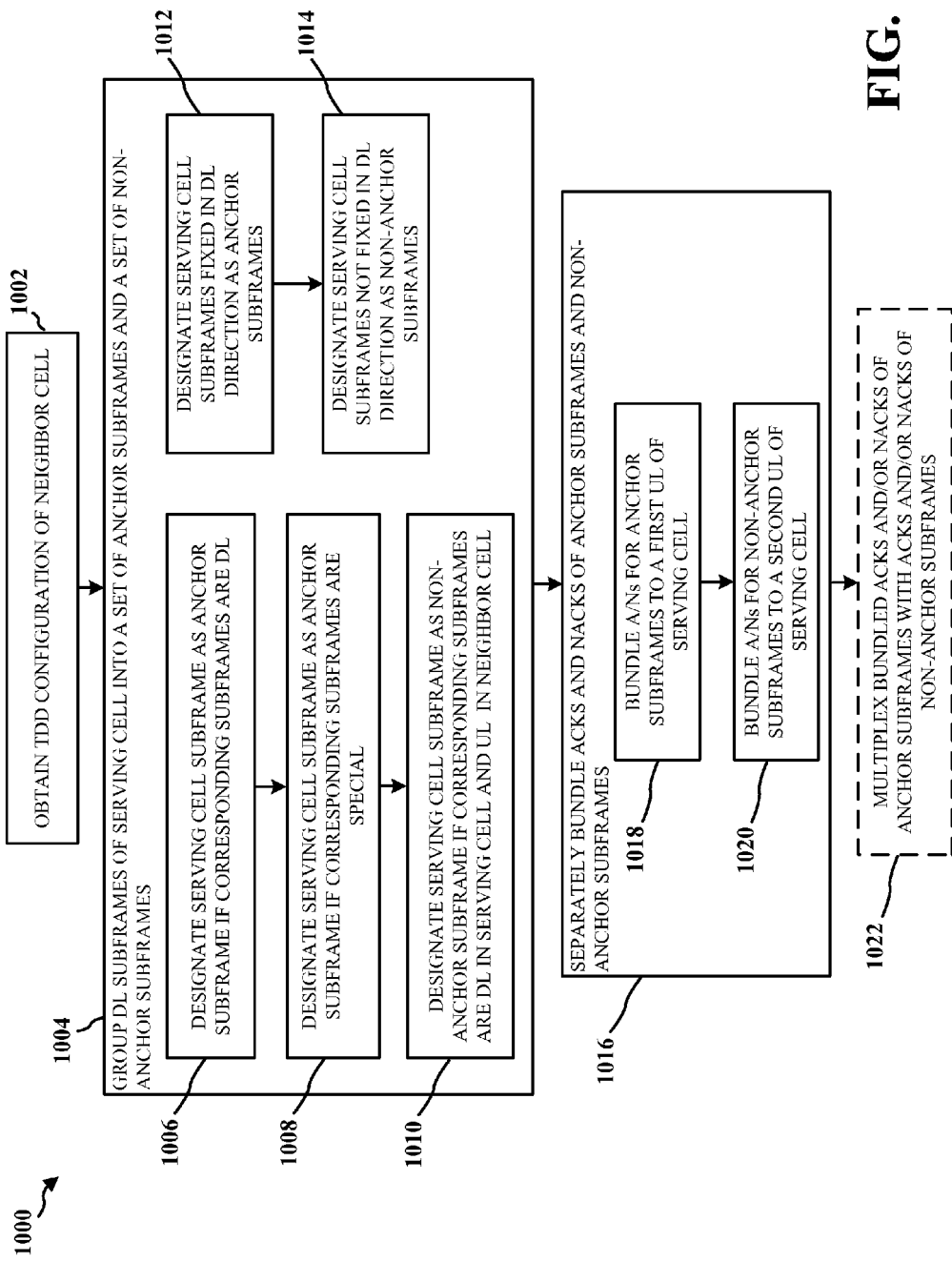
FIG. 10 is a flow chart of a method of wireless communication.

FIG. 10 is a flow chart 1000 of a method of wireless communication. The method may be performed by a UE operating within a serving cell. At step 1002, the UE obtains a TDD configuration of a neighboring cell. This may occur through an X2 interface message between a serving cell base station and a neighboring cell base station.

At step 1004, the UE groups subframes of a TDD configuration of a serving cell into a set of anchor subframes and a set of non-anchor subframes. In one grouping arrangement (corresponding to steps 1006, 1008 and 1010), the UE groups the subframes based on a comparison of corresponding subframes of the serving cell and the neighboring cell. In another grouping arrangement (corresponding to steps 1012 and 1014), the UE groups the subframes based on the fixed or non-fixed designations of the subframes.

Considering the first grouping arrangement further, at step 1006 the UE designates one or more downlink subframes of the serving cell as an anchor subframe when corresponding subframes of the serving cell and the neighboring cell are downlink subframes. This is illustrated, for example at subframes 0 and 5 of the TDD configurations in FIG. 8.

At step 1008, the UE designates one or more special subframes of the serving cell as an anchor subframe when corresponding subframes of the serving cell and the neighboring cell are special subframes. This is illustrated, for example at subframes 1 and 6 of the TDD configurations in FIG. 8.

At step 1010, the UE designates one or more downlink subframes of the serving cell as a non-anchor frame when corresponding subframes of the serving cell and the neighboring cell comprise a downlink subframe in the serving cell and an uplink subframe in the neighboring cell. This is illustrated, for example at subframes 3, 4, 8 and 9 of the TDD configurations in FIG. 8.

Considering the alternative grouping arrangement further, at step 1012 the UE designates, as anchor subframes, one or more downlink subframes of the serving cell that are fixed in the downlink direction. At step 1014 the UE designates, as non-anchor subframes, one or more downlink subframes of the serving cell that are not fixed in the downlink direction.

Upon completion of subframe grouping, at step 1016, the UE separately bundles ACKs and/or NACKs of the anchor subframes, and ACKs and/or NACKs of the non-anchor subframes. This is illustrated, for example, by the brackets 810, 814 in FIG. 8.

At step 1018, the UE bundles the ACKs and/or NACKs for the anchor subframes to a first uplink subframe of the serving cell. In other words, the UE signals the result of the A/N bundling process (e.g., the logical-AND operation described above) in a first uplink subframe of the serving cell. This is illustrated, for example, at the uplink subframes 812 in FIG. 8.

At step 1020, the UE bundles the ACKs and/or NACKs for the non-anchor subframes to a second uplink subframe of the serving cell. In other words, the UE signals the result of the A/N bundling process (e.g., the logical-AND operation described above) in a second uplink subframe of the serving cell. This is illustrated, for example, at the uplink subframes 816 in FIG. 8. As an alternative to signaling the A/N bundling result of the anchor subframes and non-anchor subframes in respective uplink subframes, at step 1022, the UE may multiplex the bundled ACKs and/or NACKs of the anchor subframes with the ACKs and/or NACKs of the non-anchor subframes and signal the multiplex result in a single uplink subframe.

Figure 11:
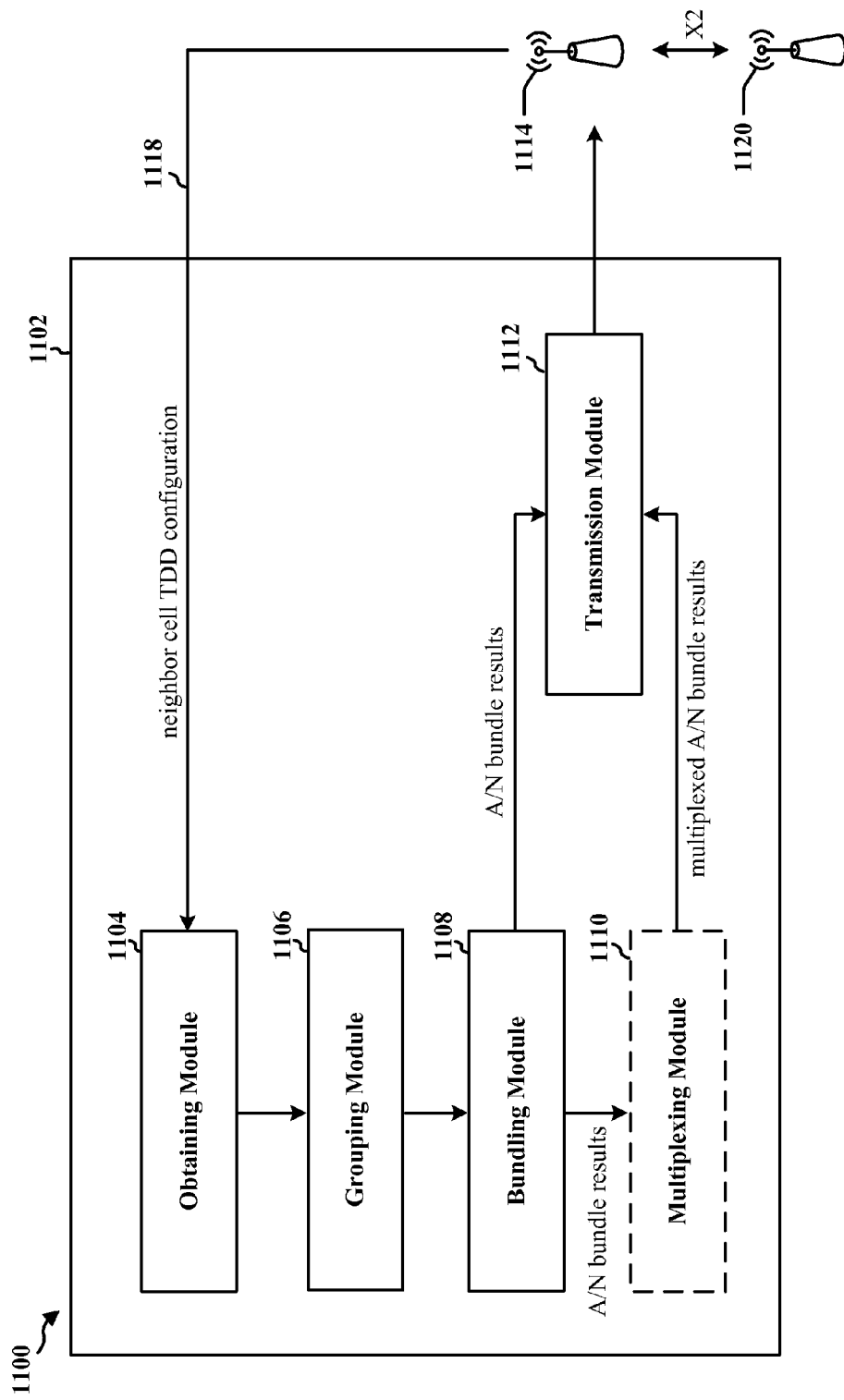
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE operating within a serving cell served by a serving eNB 1114. The apparatus 1102 includes an obtaining module 1104, a grouping module 1106, a bundling module 1108, an optional multiplexing module 1110 and a transmission module 1112.

The obtaining module 1104 obtains the TDD configuration of a neighboring cell that neighbors the serving cell. The TDD configuration may be obtained through a X2 interface message received by the base station 1114 of the serving cell from the base station 1120 of the neighboring cell. Information 1118 corresponding to the TDD configuration is then transmitted from the serving-cell base station 1114 to the UE obtaining module 1104, which may correspond to a receiver.

The grouping module 1106 groups subframes of a TDD configuration of the serving cell into a set of anchor subframes and a set of non-anchor subframes, for example, as described above with reference to FIG. 8. The bundling module 1108 separately bundles ACKs and/or NACKs of the anchor subframes, and ACKs and/or NACKs of the non-anchor subframes. The bundling module 1108 may designate the signaling of the result of the A/N bundling process (e.g., the logical-AND operation described above) for the anchor subframes in a first uplink subframe of the serving cell, and the result of the A/N bundling process (e.g., the logical-AND operation described above) for the non-anchor subframes in a second uplink subframe of the serving cell.

In one configuration, the transmission module 1112 receives the respective anchor subframe and non-anchor subframe A/N bundling results with corresponding uplink subframe designation from the bundling module 1108 and transmits the results to the serving-cell base station 1114. Alternatively, the optional multiplexing module 1110 may receive the respective anchor subframe and non-anchor subframe A/N bundling results from the bundling module 1108 and multiplex the bundled ACKs and/or NACKs of the anchor subframes with the ACKs and/or NACKs of the non-anchor subframes for transmission in a single uplink subframe by the transmission module 1116.

The apparatus may include additional modules that perform each of the steps of the algorithm in the aforementioned flow charts of FIG. 10. As such, each step in the aforementioned flow charts of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
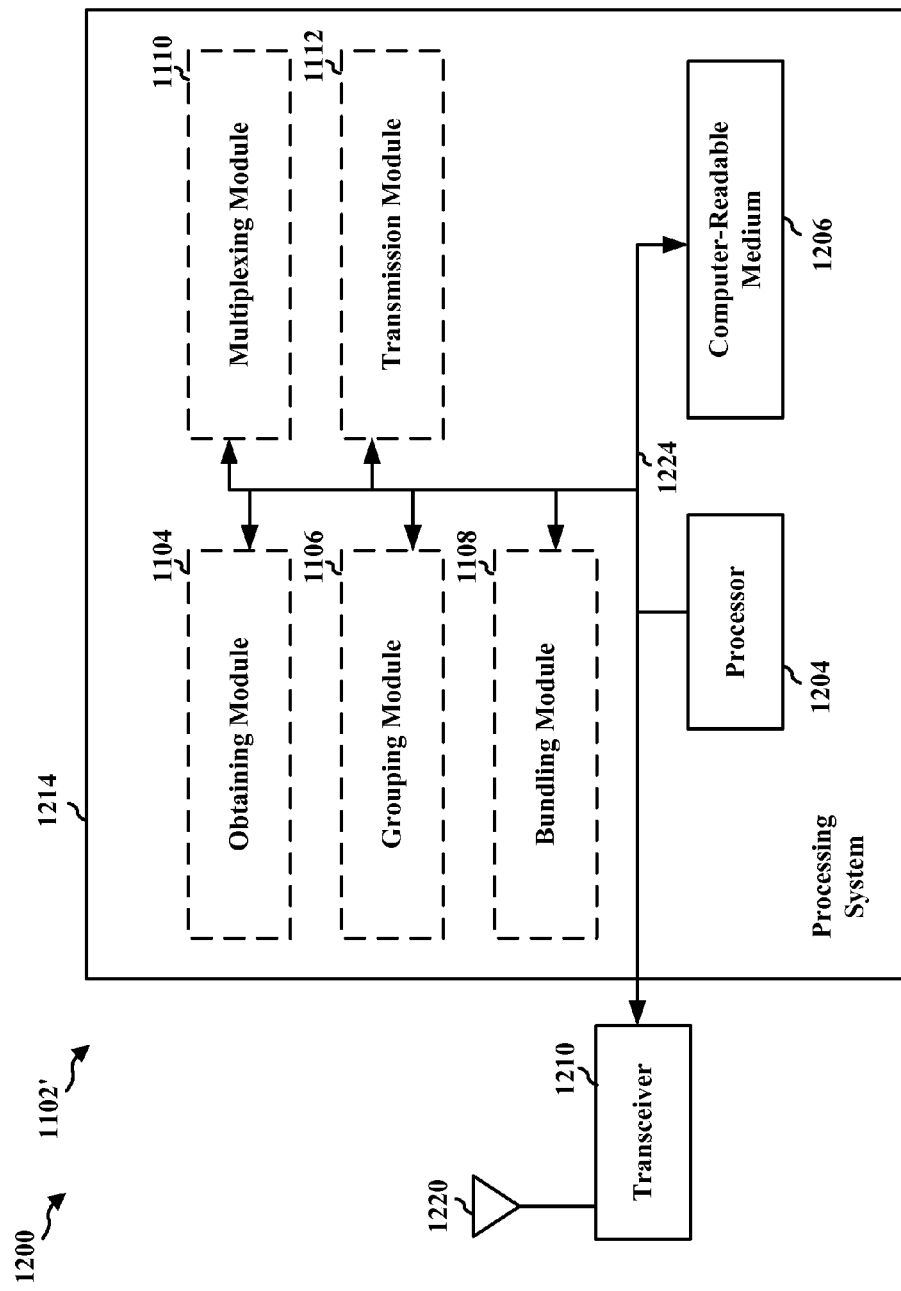
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110 and 1112, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110 and 1112. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for grouping subframes of a TDD configuration of a serving cell into a set of anchor subframes and a set of non-anchor subframes, means for separately bundling ACKs and/or NACKs of the anchor subframes, and ACKs and/or NACKs of the non-anchor subframes, means for obtaining the TDD configuration of a neighboring cell that neighbors the serving cell, and means for multiplexing the bundled ACKs and/or NACKs of the anchor subframes with the ACKs and/or NACKs of the non-anchor subframes.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment, comprising:

grouping, in a first frame, subframes of a time division duplex (TDD) configuration of a serving cell into a set of anchor subframes and a set of non-anchor subframes, wherein one or more first downlink subframes or one or more special subframes of the serving cell are grouped in the set of anchor subframes when corresponding subframes of the serving cell and a neighboring cell are both downlink subframes or both special subframes, and wherein one or more second downlink subframes of the serving cell are grouped in the set of non-anchor subframes when corresponding subframes of the serving cell and the neighboring cell include a downlink subframe in the serving cell and an uplink subframe in the neighboring cell;

separately bundling positive acknowledgements (ACKs) and/or negative acknowledgements (NACKs) of the set of anchor subframes to a first uplink subframe in a second frame of the serving cell, and ACKs and/or NACKs of the set of non-anchor subframes to a second uplink subframe in the second frame of the serving cell; and multiplexing the bundled ACKs and/or NACKs of the set of anchor subframes with the ACKs and/or NACKs of the set of non-anchor subframes.

2. The method of claim 1, wherein grouping subframes comprises:

designating the one or more first downlink subframes of the serving cell as an anchor subframe when corresponding subframes of the serving cell and the neighboring cell are downlink subframes.

3. The method of claim 1, wherein grouping subframes comprises:

designating the one or more special subframes of the serving cell as an anchor subframe when corresponding subframes of the serving cell and the neighboring cell are special subframes.

4. The method of claim 1, wherein grouping subframes comprises:

designating the one or more second downlink subframes of the serving cell as a non-anchor subframe when corresponding subframes of the serving cell and the neighboring cell comprise a downlink subframe in the serving cell and an uplink subframe in the neighboring cell.

5. The method of claim 1, wherein grouping subframes comprises:

designating, as anchor subframes, one or more downlink subframes of the serving cell that are fixed in a downlink direction.

6. The method of claim 1, wherein grouping subframes comprises:

designating, as non-anchor subframes, one or more downlink subframes of the serving cell that are not fixed in a downlink direction.

7. The method of claim 1, wherein bundling further comprises:

bundling the ACKs and/or NACKs for the set of anchor subframes to the first uplink subframe in the second frame of the serving cell; and bundling the ACKs and/or NACKs for the set of non-anchor subframes to the second uplink subframe in the second frame of the serving cell.

8. The method of claim 1, further comprising obtaining the TDD configuration of the neighboring cell that neighbors the serving cell.

9. An apparatus for wireless communication, comprising:

means for grouping, in a first frame, subframes of a time division duplex (TDD) configuration of a serving cell into a set of anchor subframes and a set of non-anchor subframes, wherein one or more first downlink subframes or one or more special subframes of the serving cell are grouped in the set of anchor subframes when corresponding subframes of the serving cell and a neighboring cell are both downlink subframes or both special subframes, and wherein one or more second downlink subframes of the serving cell are grouped in the set of non-anchor subframes when corresponding subframes of the serving cell and the neighboring cell comprise a downlink subframe in the serving cell and an uplink subframe in the neighboring cell; and means for separately bundling positive acknowledgements (ACKs) and/or negative acknowledgements (NACKs) of the set of anchor subframes to a first uplink subframe in a second frame of the serving cell, and ACKs and/or NACKs of the set of non-anchor subframes to a second uplink subframe in the second frame of the serving cell.

10. The apparatus of claim 9, wherein the means for grouping subframes is configured to designate the one or more first downlink subframes of the serving cell as an anchor subframe when corresponding subframes of the serving cell and the neighboring cell are downlink subframes.

11. The apparatus of claim 9, wherein the means for grouping subframes is configured to designate the one or more special subframes of the serving cell as an anchor subframe when corresponding subframes of the serving cell and the neighboring cell are special subframes.

12. The apparatus of claim 9, wherein the means for grouping subframes is configured to designate the one or more second downlink subframes of the serving cell as a non-anchor subframe when corresponding subframes of the serving cell and the neighboring cell comprise a downlink subframe in the serving cell and an uplink subframe in the neighboring cell.

13. The apparatus of claim 9, wherein the means for grouping subframes is configured to designate, as anchor subframes, one or more downlink subframes of the serving cell that are fixed in a downlink direction.

14. The apparatus of claim 9, wherein the means for grouping subframes is configured to designate, as non-anchor subframes, one or more downlink subframes of the serving cell that are not fixed in a downlink direction.

15. The apparatus of claim 9, wherein the means for bundling is configured to:
bundle the ACKs and/or NACKs for the set of anchor subframes to the first uplink subframe in the second frame of the serving cell; and
bundle the ACKs and/or NACKs for the set of non-anchor subframes to the second uplink subframe in the second frame of the serving cell.

16. The apparatus of claim 9, further comprising means for obtaining the TDD configuration of the neighboring cell that neighbors the serving cell.

17. The apparatus of claim 9, further comprising means for multiplexing the bundled ACKs and/or NACKs of the set of anchor subframes with the ACKs and/or NACKs of the set of non-anchor subframes.

18. An apparatus for wireless communication, comprising:
a memory; and
at least one processor coupled to the memory and configured to:
group, in a first frame, subframes of a time division duplex (TDD) configuration of a serving cell into a set of anchor subframes and a set of non-anchor subframes, wherein one or more first downlink subframes or one or more special subframes of the serving cell are grouped in the set of anchor subframes when corresponding subframes of the serving cell and a neighboring cell are both downlink subframes or both special subframes, and wherein one or more second downlink subframes of the serving cell are grouped in the set of non-anchor subframes when corresponding subframes of the serving cell and the neighboring cell comprise a downlink subframe in the serving cell and an uplink subframe in the neighboring cell; and separately bundle positive acknowledgements (ACKs) and/or negative acknowledgements (NACKs) of the set of anchor subframes to a first uplink subframe in a second frame of the serving cell, and ACKs and/or NACKs of the set of non-anchor subframes to a second uplink subframe in the second frame of the serving cell.

19. The apparatus of claim 18, wherein the at least one processor is configured to designate the one or more first downlink subframes of the serving cell as an anchor subframe when corresponding subframes of the serving cell and the neighboring cell are downlink subframes.

20. The apparatus of claim 18, wherein the at least one processor is configured to designate the one or more special subframes of the serving cell as an anchor subframe when corresponding subframes of the serving cell and the neighboring cell are special subframes.

21. The apparatus of claim 18, wherein the at least one processor is configured to designate the one or more second downlink subframes of the serving cell as a non-anchor subframe when corresponding subframes of the serving cell and the neighboring cell comprise a downlink subframe in the serving cell and an uplink subframe in the neighboring cell.

22. The apparatus of claim 18, wherein the at least one processor is configured to designate, as anchor subframes, one or more downlink subframes of the serving cell that are fixed in a downlink direction.

23. The apparatus of claim 18, wherein the at least one processor is configured to designate, as non-anchor subframes, one or more downlink subframes of the serving cell that are not fixed in a downlink direction.

24. The apparatus of claim 18, wherein the at least one processor is further configured to:
bundle the ACKs and/or NACKs for the set of anchor subframes to the first uplink subframe in the second frame of the serving cell; and
bundle the ACKs and/or NACKs for the set of non-anchor subframes to the second uplink subframe in the second frame of the serving cell.

25. The apparatus of claim 18, the at least one processor further configured to obtain the TDD configuration of the neighboring cell that neighbors the serving cell.

26. The apparatus of claim 18, the at least one processor further configured to multiplex the bundled ACKs and/or NACKs of the set of anchor subframes with the ACKs and/or NACKs of the set of non-anchor subframes.

27. A non-transitory computer-readable medium storing computer executable code, comprising code for:
grouping, in a first frame, subframes of a time division duplex (TDD) configuration of a serving cell into a set of anchor subframes and a set of non-anchor subframes, wherein one or more first downlink subframes or one or more special subframes of the serving cell are grouped in the set of anchor subframes when corresponding subframes of the serving cell and a neighboring cell are both downlink subframes or both special subframes, and wherein one or more second downlink subframes of the serving cell are grouped in the set of non-anchor subframes when corresponding subframes of the serving cell and the neighboring cell comprise a downlink subframe in the serving cell and an uplink subframe in the neighboring cell;

separately bundling positive acknowledgements (ACKs) and/or negative acknowledgements (NACKs) of the set of anchor subframes to a first uplink subframe in a second frame of the serving cell, and ACKs and/or NACKs of the set of non-anchor subframes to a second uplink subframe in the second frame of the serving cell.

28. The non-transitory computer-readable medium of claim 27, further comprising code for designating the one or more first downlink subframes of the serving cell as an anchor subframe when corresponding subframes of the serving cell and the neighboring cell are downlink subframes.

29. The non-transitory computer-readable medium of claim 27, further comprising code for designating the one or more special subframes of the serving cell as an anchor subframe when corresponding subframes of the serving cell and the neighboring cell are special subframes.

30. The non-transitory computer-readable medium of claim 27, further comprising code for designating the one or more second downlink subframes of the serving cell as a non-anchor subframe when corresponding subframes of the serving cell and the neighboring cell comprise a downlink subframe in the serving cell and an uplink subframe in the neighboring cell.

31. The non-transitory computer-readable medium of claim 27, further comprising code for designating, as anchor subframes, one or more downlink subframes of the serving cell that are fixed in a downlink direction.

32. The non-transitory computer-readable medium of claim 27, further comprising code for designating, as non-anchor subframes, one or more downlink subframes of the serving cell that are not fixed in a downlink direction.

33. The non-transitory computer-readable medium of claim 27, further comprising code for:
bundling the ACKs and/or NACKs for the set of anchor subframes to the first uplink subframe in the second frame of the serving cell; and
bundling the ACKs and/or NACKs for the set of non-anchor subframes to the second uplink subframe in the second frame of the serving cell.

34. The non-transitory computer-readable medium of claim 27, further comprising code for obtaining the TDD configuration of neighboring cell that neighbors the serving cell.

35. The non-transitory computer-readable medium of claim 27, further comprising code for multiplexing the bundled ACKs and/or NACKs of the set of anchor subframes with the ACKs and/or NACKs of the set of non-anchor subframes.

* * * * *